(12) United States Patent
Nishiuwatoko

(10) Patent No.: US 6,900,814 B2
(45) Date of Patent: May 31, 2005

(54) CAD APPARATUS AND OUTPUT PROCESSING METHOD FOR CAD APPARATUS

(76) Inventor: Tsutomu Nishiuwatoko, Canon Kabushiki Kaisha 3-30-2, Shimomaruko, Ohta-ku, Tokyo (JP)

( * ) Notice: Subject to any disclaimer, the term of this patent is extended or adjusted under 35 U.S.C. 154(b) by 0 days.

(21) Appl. No.: 10/729,141

(22) Filed: Dec. 4, 2003

(65) Prior Publication Data

US 2004/0113918 A1 Jun. 17, 2004

(30) Foreign Application Priority Data

Dec. 6, 2002 (JP) ........................................ 2002-355476
Oct. 15, 2003 (JP) ........................................ 2003-355115

(51) Int. Cl.⁷ ................................................ G09G 5/00
(52) U.S. Cl. ........................ 345/581; 345/420; 715/964
(58) Field of Search ................................ 345/419, 420, 345/581, 582, 583, 619; 715/848, 849, 852, 964

(56) References Cited

U.S. PATENT DOCUMENTS

2002/0118229 A1 * 8/2002 Batori et al. ................. 345/771

* cited by examiner

*Primary Examiner*—Matthew Luu

(57) ABSTRACT

To provide a three-dimensional CAD apparatus for collectively performing the appropriate image processing of color or gradation on the face or edge line for a 3D model in accordance with a processing for the 3D model instructed by the user. Thereby, it is unnecessary to set the color for each portion every time different processing is performed, whereby the fast operation is enabled.

9 Claims, 6 Drawing Sheets

FIG. 2A

| MODEL IDENTIFICATION NUMBER | 1 | 2 | 3 | ... |
|---|---|---|---|---|
| 1st SETTING | 5R 5/10 | 5B 5/10 | 5G 5/10 | |
| 2nd SETTING | 5B 7/1 | 5B 7/1 | 5B 5/1 | |

FIG. 2B

| | DISPLAY MODE 1 | DISPLAY MODE 2 | DISPLAY MODE 3 | DISPLAY MODE 4 | DISPLAY MODE 5 | DISPLAY MODE 6 | DISPLAY MODE 7 |
|---|---|---|---|---|---|---|---|
| MODEL DISPLAY COLOR HUE | MODEL 1st SETTING | MODEL 1st SETTING | MODEL 1st SETTING | N10 | MODEL 2nd SETTING | N7 | N3 |
| MODEL DISPLAY COLOR BRIGHTNESS | 5 | 5 | 5 | – | MODEL 2nd SETTING | – | – |
| MODEL DISPLAY COLOR SATURATION | 10 | 14 | 14 | – | MODEL 2nd SETTING | – | – |
| MODEL EDGE LINE COLOR | ALL N7 | ALL N7 | ALL N7 | ALL N1.5 | HIDDEN | EACH EDGE LINE SETTING COLOR | N10 |
| BACKGROUND COLOR | N1.5 | N1.5 | N10 | N10 | N10 | N1.5 | N1.5 |
| GRADATION | | | | ○ | | | ○ |

FIG. 2C

| EDGE LINE ID OF MODEL ID 1 | SETTING COLOR |
|---|---|
| 1 | 5R 5/14 |
| 2 | 5R 5/14 |
| 3 | N1.5 |
| 4 | N1.5 |
| 5 | N1.5 |
| ... | |

| EDGE LINE ID OF MODEL ID 2 | SETTING COLOR |
|---|---|
| 1 | N1.5 |
| 2 | N1.5 |
| 3 | N1.5 |
| 4 | 5R 5/14 |
| 5 | N1.5 |
| ... | |

FIG. 2D

COLOR EXPRESSION BY MUNSELL COLOR SYSTEM 5R 5/10 → HUE, BRIGHTNESS, SATURATION

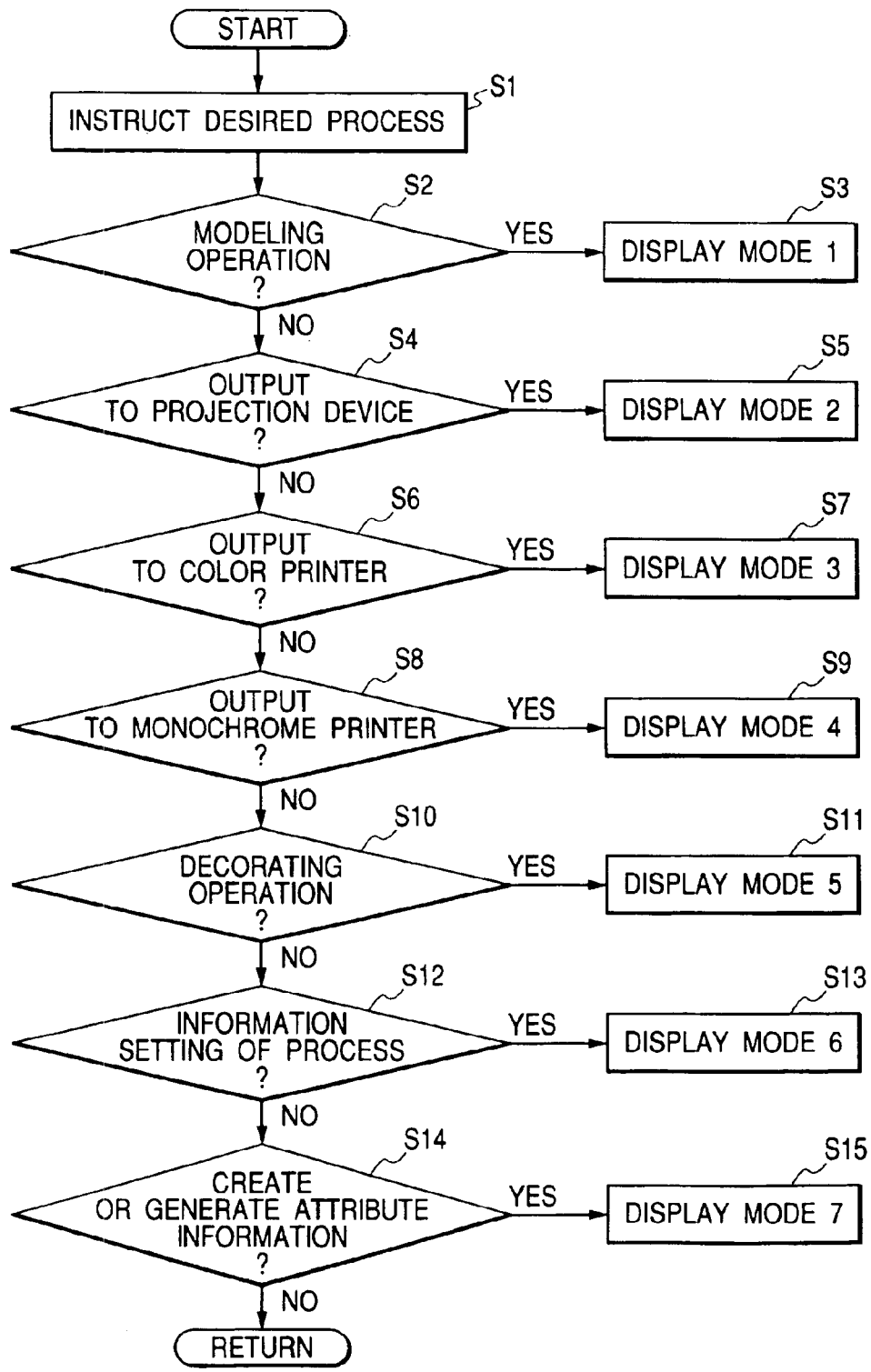

CAD APPARATUS AND OUTPUT PROCESSING METHOD FOR CAD APPARATUS

BACKGROUND OF THE INVENTION

1. Field of the Invention

The present invention relates to an information processing apparatus and method, and more particularly to an information processing apparatus (three dimensional CAD apparatus) using a 3D model (three dimensional shape) created with 3D-CAD.

2. Related Background Art

Conventionally, the articles having three dimensional shape such as parts making up the product (hereinafter simply referred to as parts) are designed, using a CAD apparatus (particularly a 3D-CAD apparatus). The design using the 3D-CAD apparatus is made by inputting the attribute information such as size, dimensional tolerance, geometrical tolerance, note and symbol, and associating it with the 3D model, in addition to molding the 3D model (3D shape) itself. The CAD apparatus that treats the surface model or solid model is also employed for the design evaluation or presentation of parts or product.

For the CAD apparatus, a monitor device, a projection device, a color printer and a monochrome printer are available as its output means.

As with the conventional techniques, when the CAD apparatus is employed, the display conditions for the 3D model or view might be selected in accordance with its purpose or use apparatus.

For example, when the design of product or parts, especially the modeling operation, was made, the face, edge line, or background color of each part was displayed in different hue, clarifying the distinction of parts.

However, in selecting the color to be used, the user was required to change the color attribute of face, edge line, or background color of each part every time, and perform a complex operation.

SUMMARY OF THE INVENTION

The present invention has been achieved in the light of the above-mentioned problems. That is, this invention provides a three-dimensional CAD apparatus that has the following feature. A desired output processing of a 3D model is selected from among a plurality of processings. The mode having a plurality of setting items for making the image processing of data for the 3D model is switched in accordance with a selection of the output processing for the 3D model from a table storing the mode in correspondence to the output processing for the 3D model.

Other features of the invention will be clarified from the following description and the accompanying drawings.

BRIEF DESCRIPTION OF THE DRAWINGS

FIGS. 2A, 2B, 2C and 2D are tables listing a 3D model output processing and its associated image processing mode;

FIG. 6 is a flowchart of the output processing for image data in this embodiment.

DESCRIPTION OF THE PREFERRED EMBODIMENTS

Figure 1:
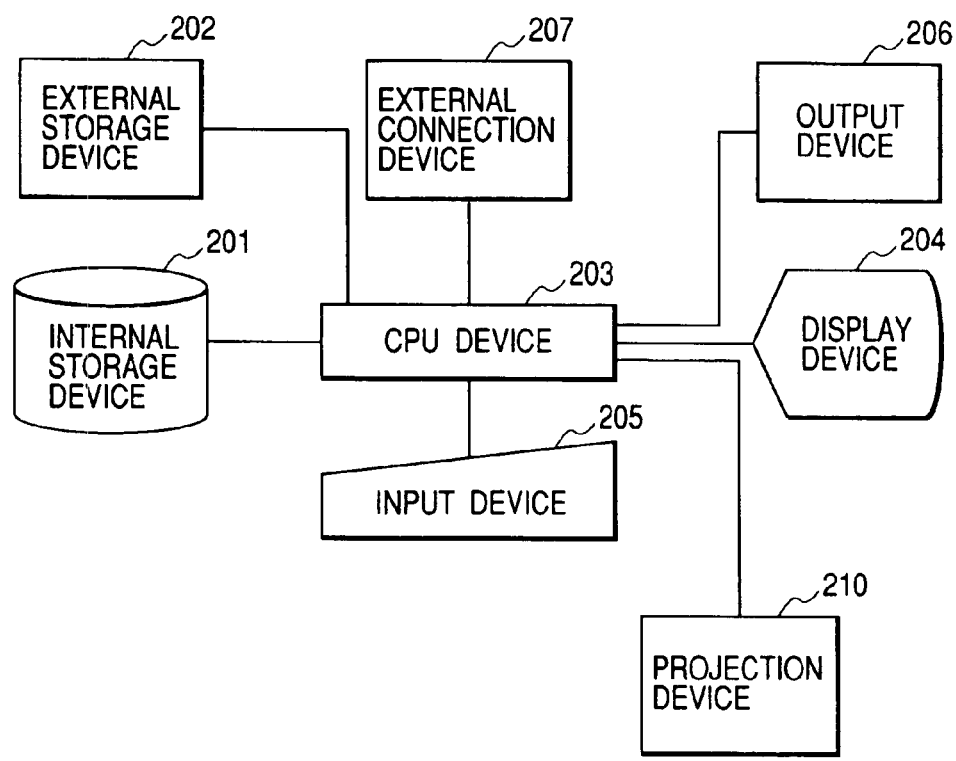
FIG. 1 is a block diagram of a 3D CAD apparatus according to an embodiment of this invention.

FIG. 1 shows the configuration of a three-dimensional CAD apparatus as an information processing apparatus according to the present invention.

In FIG. 1, the three-dimensional CAD apparatus comprises an internal storage device 201 and an external storage device 202 having a semiconductor storage device such as an RAM for storing the CAD data or CAD programs and a magnetic storage device.

Also, the three-dimensional CAD apparatus comprises an input device 205 such as a mouse or a keyboard for giving an instruction to the CAD program. The user operates the CAD program, employing this input device 205.

Also, the three-dimensional CAD apparatus comprises a CPU 203 for executing the processing in accordance with the instructions of the CAD program. Also, the three-dimensional CAD apparatus comprises an external connection device 207 for connecting this CAD apparatus to an external apparatus to supply data from the CAD apparatus to the external apparatus and control the CAD apparatus from the external apparatus.

Also, the three-dimensional CAD apparatus comprises a display device (CRT device or LCD device) 204 as a main output device, which displays shape in accordance with instructions of the CPU 203. The operator usually makes operations while seeing the display device 204.

Also, the three-dimensional CAD apparatus comprises a projection device 210 as a separate output device, which projects and displays shape of the designed 3D model in accordance with instructions of the CPU 203. Also, the three-dimensional CAD apparatus comprises a printer 206 such as a color printer or monochrome printer as a separate output device, which outputs drawings to the recording medium such as paper or OHT in accordance with instructions of the CPU 203.

The operator instructs the CPU 203 to start a CAD program using the input device 205. Moreover, the operator instructs the CPU 203 to read the CAD program stored in the external storage device 202 into the internal storage device 201. The CPU 203 performs a predetermined processing in accordance with the CAD program.

The operator can design a three-dimensional shape model (hereinafter referred to as a model) of the part by interactively operating the input device 205 to issue instructions under the control of the CPU 203. The operator may set various kinds of attribute information in addition to the shape of model.

In this embodiment, a setting display window for registering the color of each portion in the matrix form is displayed to enable registration of a plurality of modes, in which one mode defines the information regarding the display including the display color, display state of the edge line, and background color for each model, as shown in FIGS. 2A, 2B, 2C and 2D.

FIGS. 2A, 2B, 2C and 2D show examples of setting the color in the three-dimensional space. FIG. 2A shows an example of a table registering the setting colors for the three-dimensional model. A model identification number is appended beforehand to each model when a plurality of three-dimensional models exist on the same three-dimensional space. For example, when a first setting is made, the models with identification numbers 1, 2 and 3 are set at 5R5/10, 5R5/10 and 5R5/10.

FIG. 2B shows an example of a table listing the hue, brightness, and saturation on the face for a three-dimensional model, model edge line color (hue), setting of background color, and setting of presence or absence of gradation for the three-dimensional model, the three-dimensional model being subjected to image processing in each display mode as will be described later. Also, FIG. 2C shows an example of a table registering the color of edge line corresponding to an identifier (ID) for a different kind of edge line. Also, FIG. 2D shows the three attribute notation by munsell color system. Notation such as N1.5 as shown in FIGS. 2B and 2C is made by achromatic color in terms of the brightness (0 to 10) prefixed by N.

Referring now to a flowchart of FIG. 6, a display (output) operation process of the three-dimensional CAD apparatus based on instructions from the CPU 203 will be described below.

First of all, if the user inputs an instruction at step S1, the operation proceeds to step S2. An input instruction at step S1 is made by selecting an icon, not shown, displayed on the display screen of the display device 204.

At step S2, when it is determined that the instruction from the user involves a normal modeling operation on the display screen 204, the operation proceeds to step S3, where the display mode is changed to display mode 1. Display mode 1 is for the modeling operation to set the display color of each part in the model to different hue, set the edge line to all gray, and set the background color to black. The operator performs the normal modeling operation (design operation) in the display mode 1.

At step S4, when it is determined that the instruction from the user involves an image output to the projection device, the operation proceeds to step S5, where the display mode is changed to display mode 2. Display mode 2 sets the model display color to different hue, sets the edge line to all gray, and sets the background color to black, like the display mode 1, though the saturation of the display color on the model face is set higher. That is, in the case where the projection device having a low brightness is employed, the device mode is changed to display mode 2. At this time, the display device 204 is maintained in the display mode 1.

At step S6, when it is determined that the instruction from the user involves an image output to the color printer, the operation proceeds to step S7, where the display mode is changed to display mode 3. Display mode 3 sets the model display color to different hue, sets the edge line to all gray, like the display modes 1 and 2, though the background color is set to white. The operator employs the display mode 3 to perform the outputting from the color printer. Thereby, an image output from the color printer has colors set in the display mode 3. At this time, the display device 204 is maintained in the display mode 1.

At step S8, when it is determined that the instruction from the user involves an image output to the monochrome printer, the operation proceeds to step S9, where the display mode is changed to display mode 4. Display mode 4 sets the model display color and background color to white and sets the edge line to all black. Furthermore, a gradation processing of the model is effective.

Figure 3:
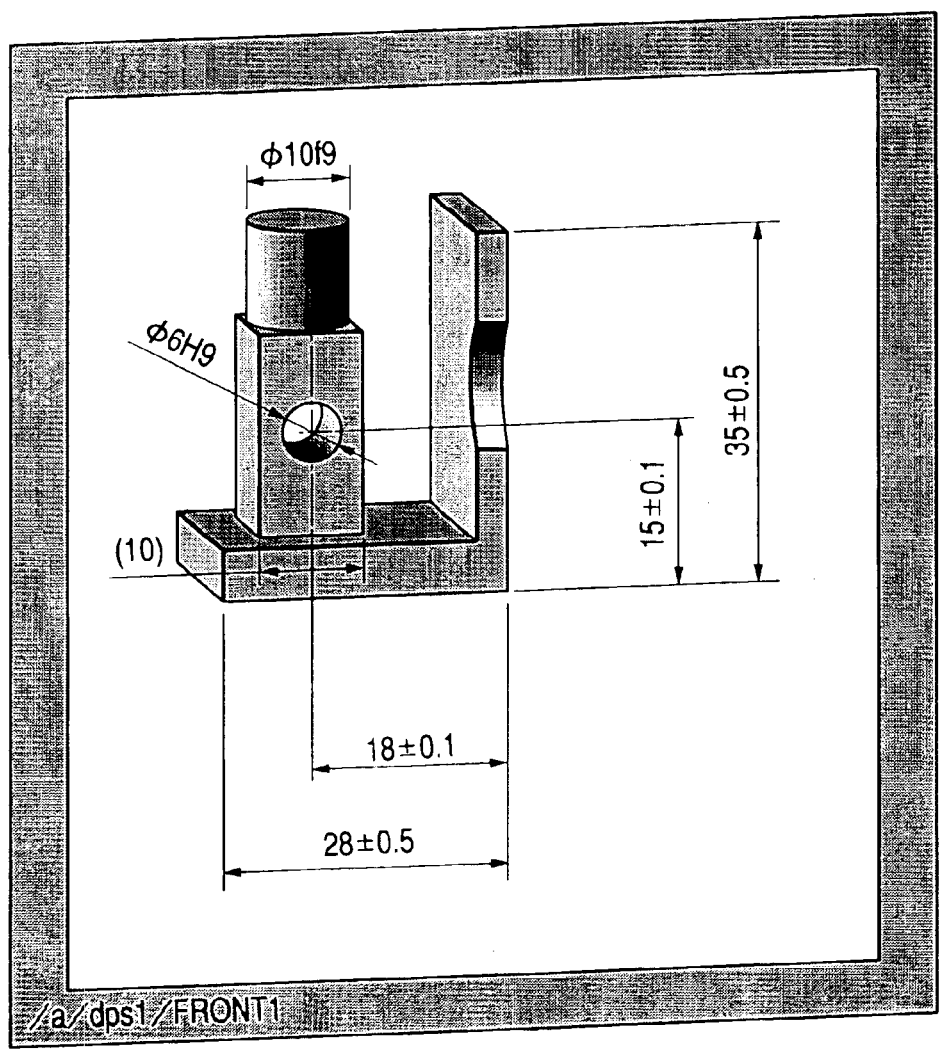
FIG. 3 is a view showing one example of a three-dimensional model displayed on the display screen of a display device 204.
Figure 4:
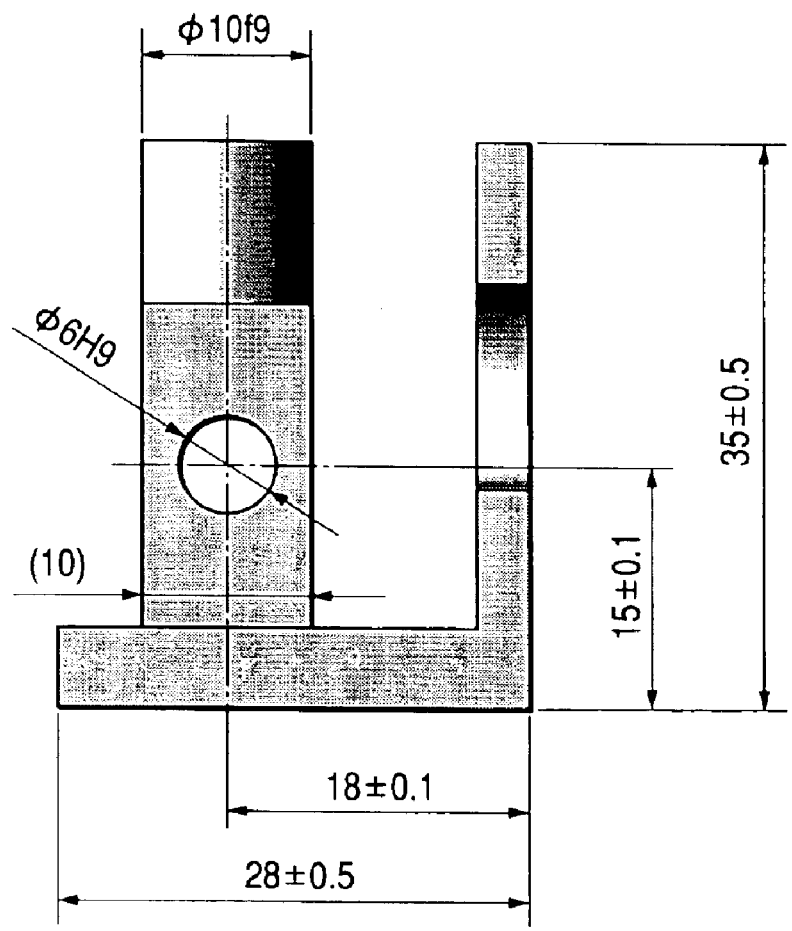
FIG. 4 is a view showing an output example of a print image when the print output is made in this embodiment.
Figure 5:
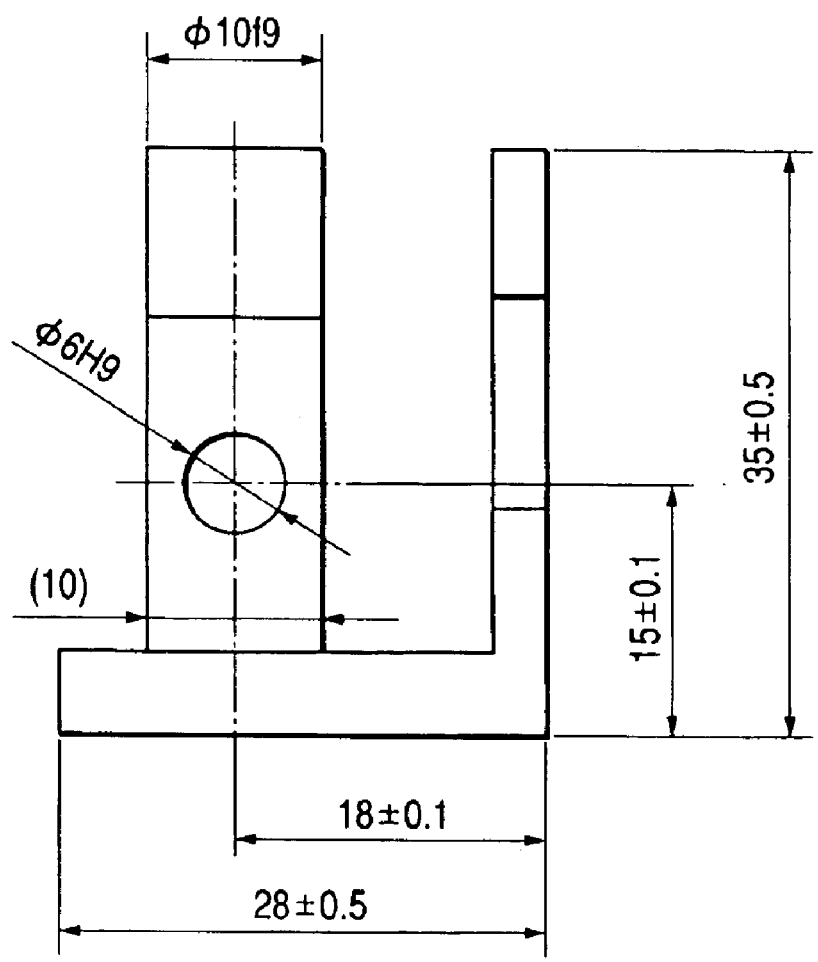
FIG. 5 is a view showing an output example of an image when no gradation processing is performed.

The gradation processing means shading the 3D model to light emitted from a light source set at an arbitrary position on an imaginary space where the 3D model is disposed. That is, when the 2D drawing is output from the monochrome printer, display mode 4 is employed. For example, in the case of a model on the three-dimensional space as shown in FIG. 3, the printing is output in such a way that the through hole is displayed by background color, or the curved surface is displayed in gradation, as shown in FIG. 4 (the 3D model is displayed in mesh in FIG. 4, but practically shaded). Therefore, it is easier to grasp the shape than the printed image without gradation as shown in FIG. 5. At this time, the display device 204 is maintained in the display mode 1. In outputting from the color printer, the gradation processing may be performed.

At step S10, when it is determined that the instruction from the user involves an ornamental operation, the operation proceeds to step S11, where the display mode is changed to display mode 5. Display mode 5 sets the model display color and edge line color to the actual or planned product color and sets the background to black. Display mode 5 is employed to make the ornamental operation or presentation on the display device 204.

At step S12, when it is determined that the instruction from the user involves a working information setting processing, the operation proceeds to step S13, where the display mode is changed to display mode 6. Display mode 6 sets the model display color to gray, sets the background color to black and sets the edge line color based on the color information associated with each edge line. The operator employs the display mode 6 to set the working information on the display device 204. Of course, the model display color, like the edge line color, may be set to display color information associated with each face.

At step S14, when it is determined that the instruction from the user involves a normal modeling operation, the operation proceeds to step S15, where the display mode is changed to display mode 2. Display mode 7 sets the background color to black, sets the model color to dark gray, and sets the edge line to white, with the attribute information associated with the selected attribute arrangement face set to white, in which the shading of model is effective. That is, the display mode 7 is employed to create or change the attribute information such as 3D model dimensions.

As described above, the image processing such as appropriate color or gradation on the face or edge line of the model is collectively performed corresponding to the processing for the 3D model instructed by the user, whereby it is unnecessary to set the color for each portion every time different processing is performed, making the operation faster.

What is claimed is:

1. A three-dimensional CAD apparatus comprising:
   a judgment unit arranged to judge whether to select an output processing for a 3D model from among a plurality of processings; and
   a storage unit arranged to store a mode having a plurality of setting items for making the image processing of data for said 3D model in correspondence to the output processing of said 3D model;
   wherein said judgment unit switches said mode in accordance with a selection of the output processing for said 3D model.

2. The apparatus according to claim 1, wherein said plurality of setting items include at least one of hue, brightness and saturation on the face for said 3D model, color of edge line for said 3D model, background color, and presence or absence of gradation.

3. The apparatus according to claim 1, wherein when said judgment unit judges that the selected output processing is performed by a projection device, said judgment unit switches the mode to that of increasing the saturation on the face of said 3D model.

4. The apparatus according to claim 1, wherein when said judgment unit judges that the selected output processing is performed by a printer, said judgment unit switches the mode to that of making a gradation processing on the face of said 3D model.

5. An output processing method for a three-dimensional CAD, comprising the steps of:

when an output processing of a 3D model from among a plurality of processings is selected, switching a mode having a plurality of setting items for making the image processing of data for said 3D model from a table storing the mode in correspondence to the output processing of said 3D model in accordance with a selection of the output processing for said 3D model.

6. The method according to claim 5, wherein said plurality of setting items include at least one of hue, brightness and saturation on the face for said 3D model, color of edge line for said 3D model, background color, and presence or absence of gradation.

7. The method according to claim 5, wherein when the output processing by a projection device is selected, the mode is switched to that of increasing the saturation on the face of said 3D model.

8. The method according to claim 7, wherein when the output processing by a printer is selected, the mode is switched to that of making a gradation processing on the face for said 3D model.

9. A program for executing the output method of the apparatus according to claim 7.

\* \* \* \* \*